United States Patent [19]

Wilson

[11] Patent Number: 4,468,902
[45] Date of Patent: Sep. 4, 1984

[54] MULTI-WALLED STRUCTURES FOR CONTROLLED ENVIRONMENTAL USE

[76] Inventor: Pryce Wilson, 2202 N. 38th St., Phoenix, Ariz. 85008

[21] Appl. No.: 416,648

[22] Filed: Sep. 10, 1982

Related U.S. Application Data

[62] Division of Ser. No. 869,832, Jan. 16, 1978, Pat. No. 4,364,208.

[51] Int. Cl.³ .............................................. E04B 7/18
[52] U.S. Cl. ............................................ 52/80; 52/82; 52/249; 52/302; 52/DIG. 4
[58] Field of Search .................... 220/448, 445, 220; 52/304, 302, 80, 82, 249

[56] References Cited

U.S. PATENT DOCUMENTS

| | | | |
|---|---|---|---|
| 698,453 | 4/1902 | De Clairmont | 220/425 |
| 1,229,912 | 6/1917 | Doncaster | 220/420 |
| 1,299,618 | 4/1919 | Robison | 220/420 |
| 1,337,611 | 4/1920 | Mendenhall | 220/420 |
| 1,433,894 | 10/1922 | Klein | 220/445 |
| 1,890,655 | 12/1932 | O'Leary | 220/420 |
| 1,945,581 | 4/1934 | Wortmann | 220/426 |
| 1,948,477 | 2/1934 | Zenner | 220/445 |
| 2,306,745 | 12/1942 | Murray | 220/448 |
| 3,114,176 | 12/1963 | Miller | 52/DIG. 10 |
| 3,236,294 | 2/1966 | Thomason | 126/271 |
| 3,347,056 | 10/1967 | Lester | 220/445 |

FOREIGN PATENT DOCUMENTS 994124  6/1965  United Kingdom ........... 52/DIG. 4

*Primary Examiner*—James L. Ridgill, Jr.
*Attorney, Agent, or Firm*—Warren F. B. Lindsley

[57] ABSTRACT

Multi-wall devices embodying two or more spaced members arranged to provide an enclosed space therebetween for controlling the transmission of energy through the members for the purpose of capturing, storing and releasing energy.

6 Claims, 19 Drawing Figures

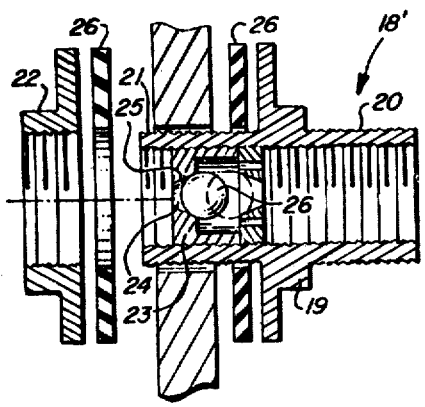
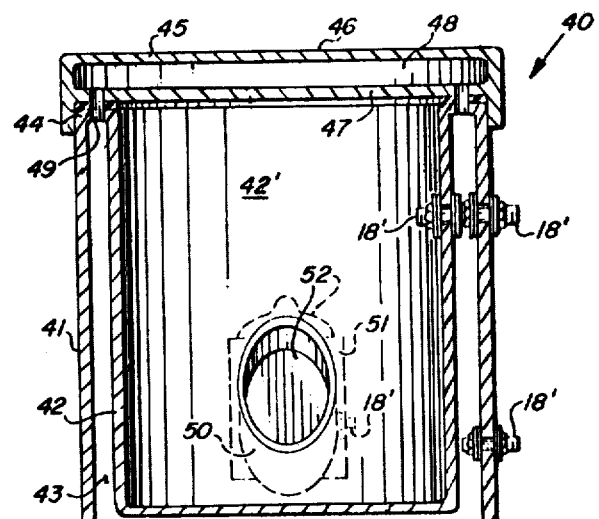
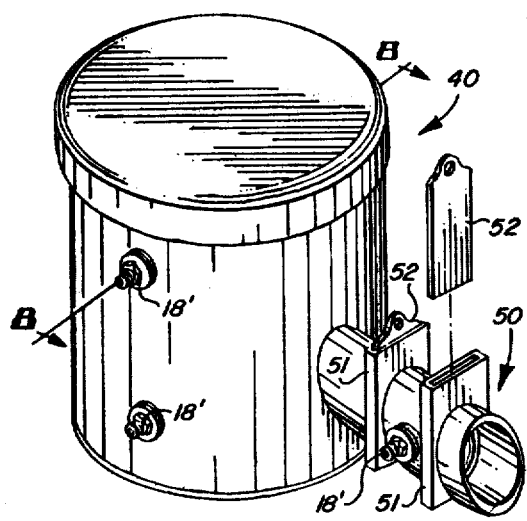
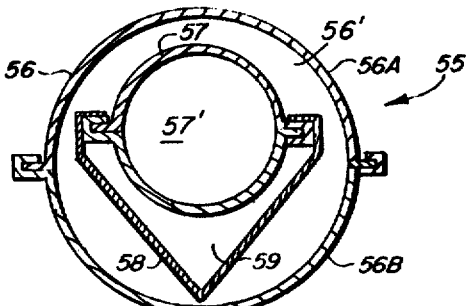
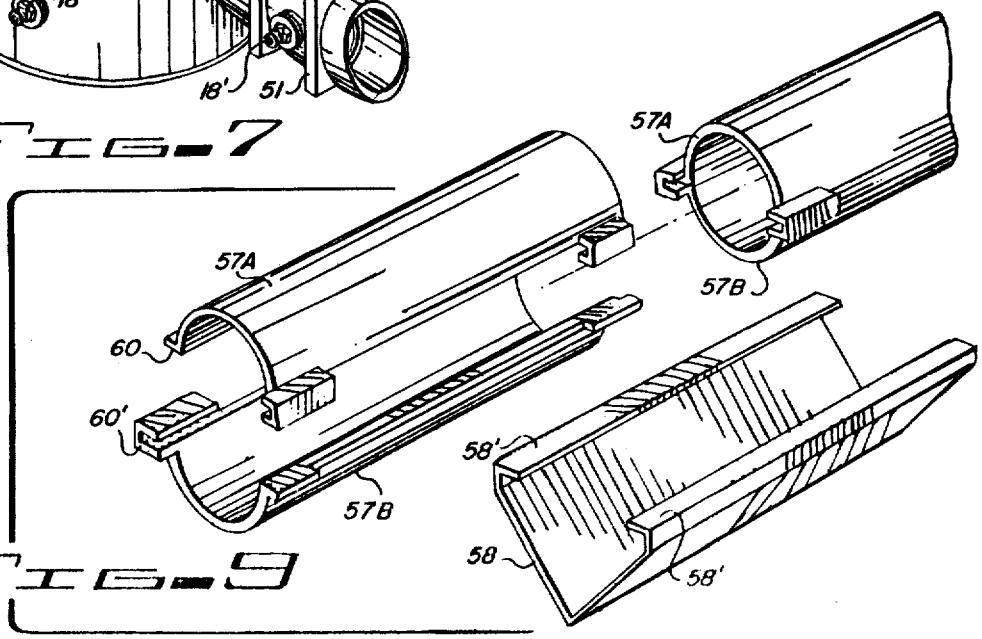

MULTI-WALLED STRUCTURES FOR CONTROLLED ENVIRONMENTAL USE

This invention is a division of U.S. patent application Ser. No. 869,832, filed Jan. 16, 1978, and entitled MULTIWALLED STRUCTURES FOR CONTROLLED ENVIRONMENTAL USE now U.S. Pat. No. 4,364,208 issued Dec. 21, 1982.

BACKGROUND OF THE INVENTION

This invention relates to objects embodying two or more spaced wall members which are intended to provide a controlled atmosphere or vacuum therebetween for environmental purposes.

Since it is a continuing problem to control the temperature of the environment for housing animals, minerals, plants and products, a need exists for utilizing the existing temperature of the earth, atmosphere and even the body heat of animal life to maintain and preserve temperatures needed for life with only a minimum use, if any at all, of commercial fuels.

DESCRIPTION OF THE PRIOR ART

Since the discovery of fire, its benefits have clouded any attempt to conceive of its benefits being furnished by any other means. We continue to seek materials and substances of the earth to provide these benefits while recent enlightenment indicates the ensuing depletion of these natural energies. We continue to extensively coredrill the earth's crust seeking these sources.

The building trades over the centuries have strived to improve the rigidity and space accommodations for convenient living and have utilized insulation and atmospheric controlled space for controlling the temperature variations between the interior and exterior of the buildings. Any use of vacuum as an energy source for controlling the environment of buildings has been nonexistent, or at least very primitive in its application.

SUMMARY OF THE INVENTION

In accordance with the invention claimed, a new and improved method of controlling the transmission of energy through spaced walls is provided employing the benefits of energy flow through atmospheric and below-atmospheric paths.

It is, therefore, one object of this invention to provide a new method or process of maintaining a given environment around an object.

Another object of this invention is to provide containing surfaces for a vacuum which employ a minimum of interconnecting members to reduce energy flow through the vacuum containing surfaces.

A further object of this invention is to provide a novel means for controlling the energy flow through the interconnecting members of containing surfaces of a vacuum.

A still further object of this invention is to provide a novel vacuum-enclosed building including portal means which uses the temperature of the earth and sun to control its interior environment.

A still further object is to provide a novel building structure which utilizes the properties of a vacuum and pressure to control its exterior atmosphere.

A still further object of this invention is to provide the properties of a vacuum to position and maintain one wall of a vacuum containing member relative to the other for structural building purposes while reinforcing said other wall.

A still further object of this invention is to combine the inherent structural geometrical characteristics of an object with the inherent structural functions of a vacuum.

A still further object of this invention is to provide a structure to control, capture, imprison and release energy by novel controlling means.

Further objects and advantages of the invention will become apparent as the following description proceeds; and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which:

FIG. 6 is a cross-sectional view of a suitable coupling for use in evacuating the space between the panel structures shown in FIGS. 1-5;

FIG. 7 is a further modification of the invention shown in FIGS. 1 and 2 illustrating a cylindrical storage container having a controllable atmosphere between its closely positioned walls;

FIG. 8 is a cross-sectional view of FIG. 7 taken along the line 8—8;

FIG. 9 is an exploded view of the parts for the structure shown in FIG. 10 which form an elongated pipeline in a controlled environment forming another embodiment of this invention;

FIG. 10 is a cross-sectional view of the parts shown in FIG. 9 in assembled relationship;

DESCRIPTION OF THE PREFERRED EMBODIMENT

Figure 1:
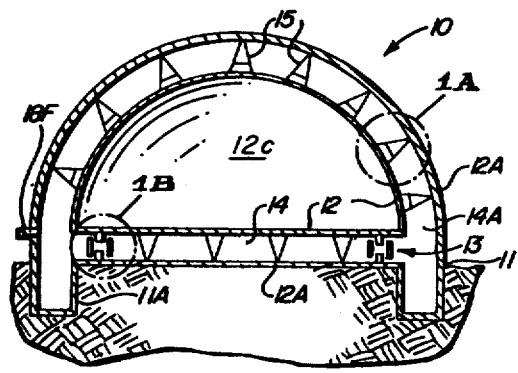
FIG. 1 is a cross-sectional view of a domical building showing a footing or foundation in dash lines and embodying the invention.

Referring more particularly to the drawings by characters of reference, FIG. 1 discloses a cross-sectional view of a domical structure 10 mounted at ground level 11 on a foundation or footing 11A which extends into the ground far enough to serve as a temperature barrier, as hereinafter explained. The domical structure is formed by a pair of spaced enclosing first and second juxtopositioned wall members 12, 12A respectively, which form the walls, floor and roof of the building.

A pair of valving and/or partitioning means 13, 13A may be used to control the atmosphere in the space 14 between the members 12, 12A forming the floor of the building, if so desired. The members 12, 12A forming the walls of the domical structure enclosing a first space 12C also define a second space 14A therebetween which controls the atmosphere in the building, as later explained.

It should be recognized that the efficiency of an evacuated space is due to the vacuum between the members defining the space. In a panel structure for building, storage or other purposes, the panels must be maintained in a spaced position by suitable struts between the closely positioned walls defining the panel structure. Each strut or separating means, however, forms a conducting path for the flow of energy, i.e. heat, cold, or the like from one wall member, such as wall member 12, to the other wall member, such as wall member 12A, and vice versa across the space 14 and 14A.

Accordingly, the number of spacers and their design configurations should be so designed to limit and control the number of such paths and the size thereof to control the energy flow therealong. The A-shaped configuration of strut 15 of FIGS. 1 and 1A provides a strong support for the closely positioned wall while limiting the energy flow paths 15A and 15B between the wall members 12 and 12A. It should be noted that paths 15A and 15B only make one contact with the outside surface of wall member 12A at point 15C and two contacts with the inside surface of wall member 12 at points 15D and 15E which may be the base of the V-shaped strut configuration.

Figures 1A, 1B:
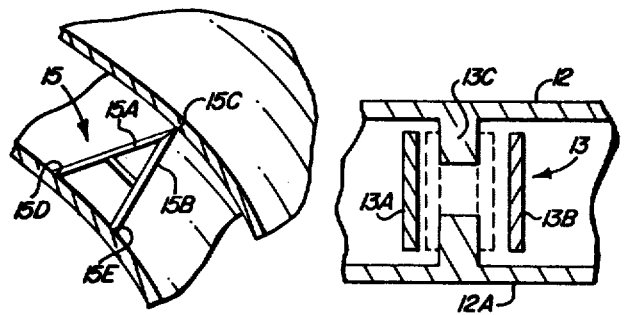
FIG. 1A is an enlarged view of the portion shown in the circle 1A of FIG. 1.
FIG. 1B is an enlarged view of the portion embodying a valving means shown in the circle 1B of FIG. 1.
Figure 1C:
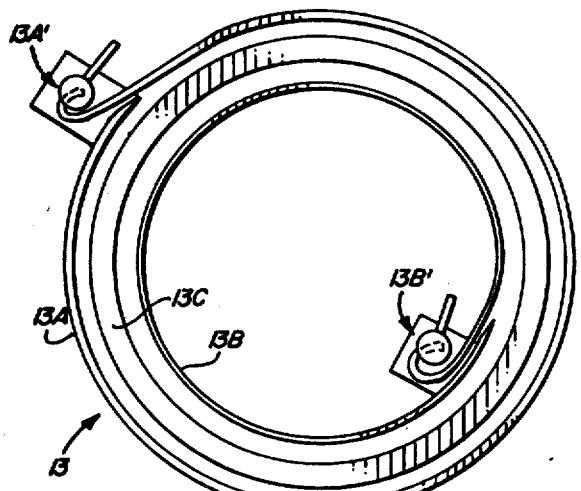
FIG. 1C is an end view of the valving means shown in FIG. 1B.

FIGS. 1B and 1C disclose an enlargement and end view, respectively, of the valving and/or partitioning means 13A which can be actuated to isolate the space 14 between the floor members 12 and 12A from the space 14A between the walls formed by members 12 and 12A.

Figure 1D:
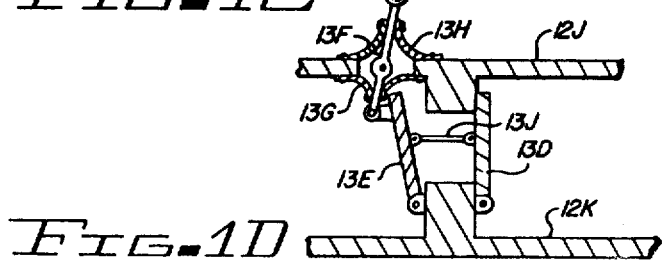
FIG. 1D is a diagrammatic illustration of a modification of the valving means shown in FIGS. 1B and 1C.

FIG. 1D illustrates a further modification of the valving means shown in FIGS. 1B and 1C, wherein a toggle linkage 13F may be resiliently mounted in a boot comprising collars 13G and 13H supported by a floor or wall member 12J which opens and closes a pair of clapper valves 13D and 13E interconnected by a tie rod 13J. The clapper valves are hingedly mounted on an extension of a juxtapositioned wall or floor member 12K.

Figure 2:
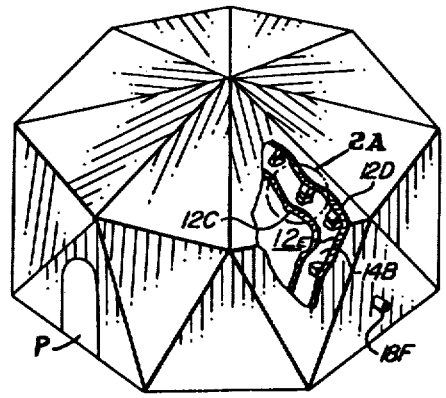
FIG. 2 is a perspective view of a polyhedron embodying a modification of structure shown in FIG. 1 and embodying the invention.
Figure 2A:
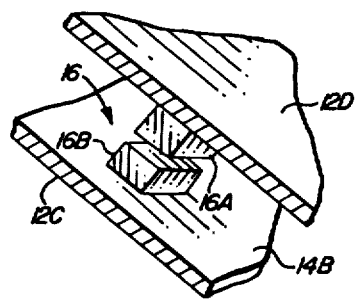
FIG. 2A is an enlarged view of the encircled portion 2A shown in FIG. 2.

FIGS. 2 and 2A illustrate a polyhedron-type structure 10A, the first and second inner and outer walls 12C and 12D enclose a first space 12E and define therebetween a second space 14B which may be evacuated as disclosed through a suitable valving means 18F under the description of FIG. 1. In this instance, the walls may be held apart in a predetermined manner by a strut 16 formed by a pair of magnets 16A and 16B having like poles facing each other with their other poles secured to the juxtapositioned surfaces of wall members 12C and 12D, as more clearly shown in FIG. 2A. A portal P is shown for ingress and egress purposes.

Figure 3:
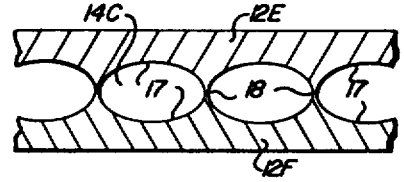
FIG. 3 is a partial cross-sectional view of a further modification of a panel structure embodying the invention for use in a side-by-side panel configuration.

FIG. 3 illustrates a modification of the wall members wherein the panel sections comprise closely positioned first and second wall members 12E and 12F which may be conformed to provide arcuate or hemispherical configurations 17, the ends 18 of the arcuate configurations forming abutting leg points separating the wall members and forming between the wall members openings 14C which may be evacuated by the valving structure 18F.

Figure 4:
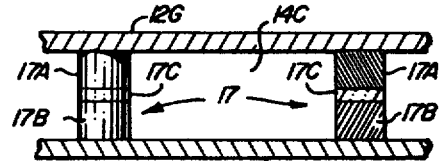
FIG. 4 is a partial cross-sectional view of a further modification of a panel structure for use in a side-by-side wall configuration.

FIG. 4 discloses a further modification of the panel structures shown in FIGS. 1–3 wherein the first and second wall members 12G and 12H may be separated by struts 17 to define a second space 14C therebetween which may be evacuated by a suitable valving arrangement. The struts 17 comprise a composite member formed of two spaced-apart members 17A and 17B separated by a suitable insulator 17C.

Figure 5:
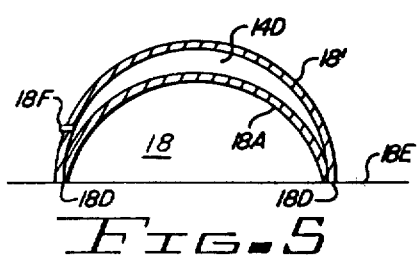
FIG. 5 is a diagrammatic cross-sectional view of a further modification of the building configurations shown in FIGS. 1 and 2.

FIG. 5 illustrates a diagrammatic cross-sectional view of two arcuate intersecting members employing spaced-apart first and second panels 18' and 18A enclosing a first space 18 and having an evacuated space 14D therebetween. These members may comprise a relatively rigid outer member 18' and a pliable inner member 18A, so that when a vacuum is drawn in the space 14D, the inner member will expand toward member 18' and be held there by its common anchor point 18D with member 18 where both are positioned on a plane 18E.

The valving structure 18F is provided to extend through one of the side members, and as shown in FIG. 1, extends through side member 12A. This connector is used to interconnect the interior 14A and 14, depending on the position of valve means 13A of domical structure 10 with suitable vacuum or pressure generating means (not shown) for use in controlling the ambient contents in space 14 and 14A. It also should be noted that a portal p shown in FIG. 2 is provided for egress and ingress, which portal maintains a vacuum-tight arrangement with the building wall interior space.

As shown in FIG. 6, the valving structure may comprise a valve employing a cylindrical sleeve 19 threaded along its outer periphery for receiving at one end 20 a connector (not shown) for connecting it to a vacuum or pressure generating means and at its other end 21 for receiving a suitable nut 22. Mounted within the cylindrical sleeve 19 is a valve 23 provided with a port 24 forming a valve seat 25 at one end for receiving a ball 26 forming the valve.

When the valving structure 18F is mounted on side member 11 of domical structure 10 or any of the enclosures disclosed in the assembled relationship shown in FIG. 6 in combination with suitable washers 26, a vacuum may be drawn on end 20 of the connector which will draw ball 26 from valve seat 25, permitting the ambient content in space 14 to be evacuated. When the vacuum generating means is discontinued, ball 26 will seat itself, thereby maintaining the vacuum condition in space 15, as is well known in the trade.

If more than one panel structure is interconnected in a manner to provide an airtight seal therebetween, a valving structure 18F may be used in a number of panels. It should be recognized that the end panels of any array of panels may be interconnected by ducts suitably sealed to maintain controlled atmospheric conditions in their space 14. Thus, a building can be assembled wherein the walls, ceiling and floor formed of such or similarly constructed panels will control the atmosphere within the building. By controlling the heat loss from the interior of the building, the temperature of the occupants of the building will help maintain the temperature therein necessary for survival. Further, the vacuum or atmospheric condition between the side members of the structures will eliminate or greatly reduce the effects of temperature from the outside of the building on the occupants inside of the building.

FIGS. 7 and 8 illustrate a modification of structures shown in FIGS. 1–5 wherein a controlled atmosphere is maintained within a cylindrical container 40 for aiding in processing its contents. The cylindrical container comprises two coaxially arranged containers 41 and 42 spaced from each other to provide a space 43 therebetween for containing a controlled atmosphere. The containers 41 and 42 are interconnected and held in spaced relationship at their tops by a flange 44. A suitable cover 45 is provided for fitting over containers 41 and 42 in a sealing arrangement and may comprise a double wall structure having first and second wall members 46 and 47 spaced from each other to provide a space 48 therebetween. Space 48 may be interconnected with space 43 between the containers 41 and 42 by a suitable duct 49 extending through flange 44 and wall member 47 of cover 45.

If cylindrical container 40 is built in the form of a silo, the inner storage compartment 42' inside of container 42 may be provided with a suitable drainage port 50 connecting the interior of container 42 through the space 43 between containers 41 and 42 with the outside world. This drainage port may comprise one or more valves 51 having a sluice gate 52 or other suitable control means.

As shown, one or more valving structures 18F may be used to connect the spaces within or between containers 41 and 42 to a vacuum means for controlling the atmospheric condition therein.

FIGS. 9 and 10 disclose a further modification of the structures shown in FIGS. 1–8 wherein an elongated conduit 55 is shown comprising an outer shell 56 comprising two interlocking semi-cylindrical parts 56A and 56B (one or both of which may be transparent) which may form an extended conduit or part thereof of a suitable length housing axially therein a second conduit 57. Conduit 57 may be formed of two interlocking semi-cylindrical parts 57A and 57B having flanges 60 and 60', respectively, which engage and interlock to form the cylindrical pipe or conveyance means called conduit 57. Conduit 57 may be an opaque color such as black, for example, which absorbs the solar rays of the sun which are transmitted through the outer conduit 56.

The conduit 57 is held in spaced arrangement with the inside periphery of shell 56 by a V-shaped bracket 58 extending along the length of conduit 57, as shown in FIGS. 9. This V-shaped bracket is provided with inturned flanges 58' at the ends of its legs which interlock with the flanges 60 and 60' on cylindrical parts 57A and 57B of conduit 57 to provide an integral structure defining a space 59 between conduit 57 and the inside periphery of V-shaped bracket 58. The V-shaped bracket 58 is suitably supported in shell 56 periodically along its length.

It should also be recognized that the interior 57' of conduit 57 may be used to transport gas or liquid products within shell 56. Further, the interior 56' of shell 56 may be evacuated to a suitable degree to maintain the temperature of the product moving through conduit 57 or to heat it by the rays of the sun, as explained above. Further, the space within the V-shaped bracket may be used to direct hot or cold gas or liquids to conduit 57 and also in maintaining and removing the temperature of the product moving through conduit 57.

Figure 11:
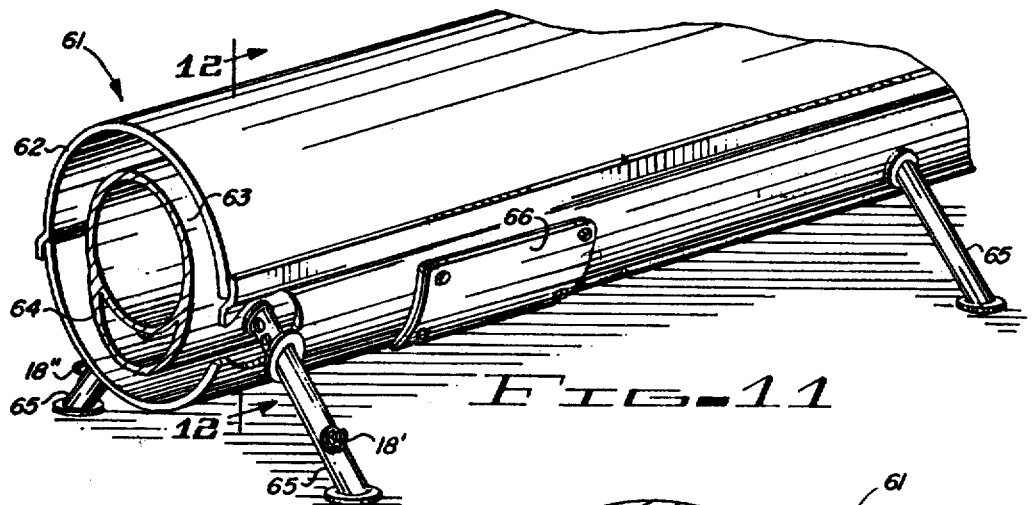
FIG. 11 is a perspective view of a still further embodiment of this invention utilizing a pressurized column for supporting a material transporting conduit in a controllable atmosphere wherein the other surface may be transparent and the outer surface of the inner tubular surface a heat absorbing color.
Figure 12:
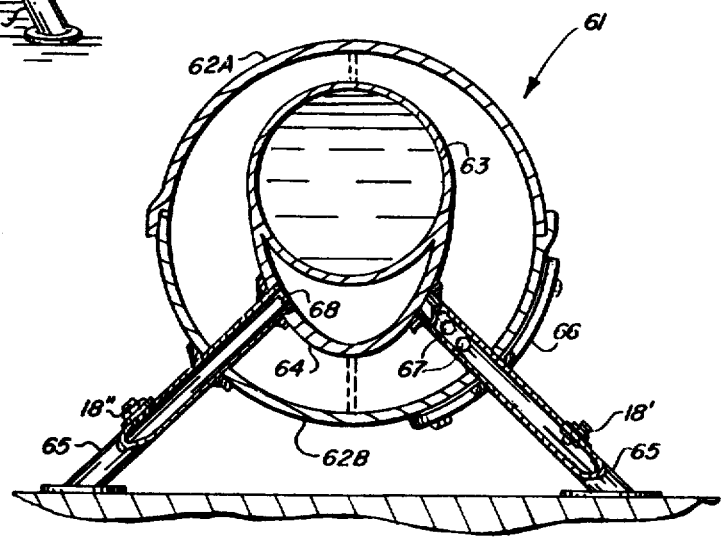
FIG. 12 is a cross-sectional view of FIG. 11 taken along the line 11—11.

FIGS. 11 and 12 disclose a further embodiment of the type of structure shown in FIGS. 9 and 10 wherein an elongated conveyor 61 in the form of a pipeline comprises an outer shell 62 which may be at least partially transparent and an inner shell 63 which may be of a dark color, i.e. opaque for absorbing solar rays, as explained above. As shown, the supporting legs 65 may form hollow conduits for interconnecting the interior of shell 62 with vacuum or pressure through connector 18" and ports 67. Protrusion 64 may also be connected with a vacuum or pressure generating means through valving structures 18" and port 68 or any other similar valving arrangement. It should be noted that an access door 66 is shown in FIG. 11 for gaining access to the inside of conveyor 61; however, conveyor 61 may comprise at least in a part of its length two semi-circular interconnected parts 61A and 61B which may be disassembled to gain access to its interior. Further, although valving structures 18" are shown in the supporting legs of the conveyor, they may be assembled in the outer surfaces of shells 61 and 62, if so desired.

Figure 14:
FIG. 14 is a cross-sectional view of FIG. 13 taken along the line 13—13.
Figure 13:
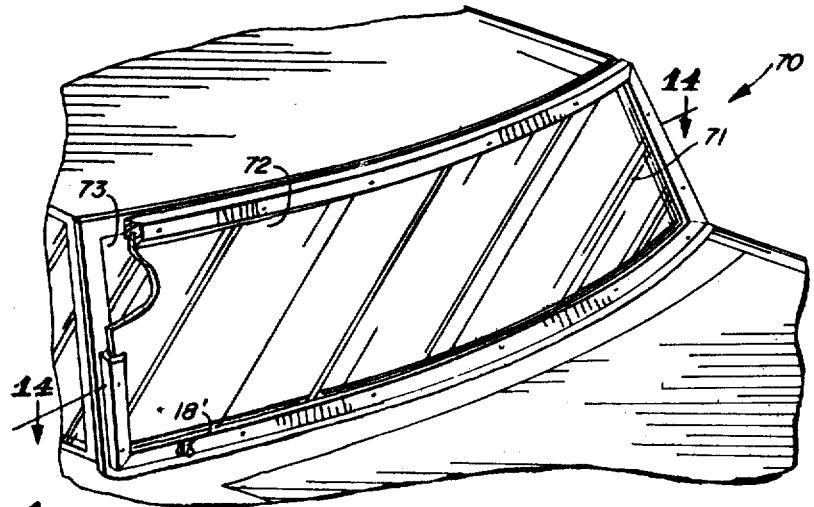
FIG. 13 is a perspective view, partially broken away, of a windshield and top of an automobile illustrating a further embodiment of this invention employing a controlled atmosphere between its juxtapositioned roof and window panes.

FIGS. 13 and 14 illustrate a still further embodiment of this invention wherein the principle of providing a closed controlled atmosphere between juxtapositioned surfaces of a wall or container is employed between the windows and the walls of a vehicle such as an automobile held apart by studs 15 of the type and for the same reasons as shown and described in the discussion of FIGS. 1 and 1A.

FIG. 13 discloses a partial view of an automobile 70 wherein the auto construction as well as its windows, shell body and flooring comprises juxtapositioned members in spaced relationship, providing a space therebetween which may be vacuum controlled in the manner heretofore disclosed for controlling the temperature in the vehicle.

As shown, the windshield 71 comprises a pair of spaced glass panes 72 and 73 separated to provide a space 74 therebetween which may be evacuated through a suitable valving arrangement such as valving structure 18F heretofore described. The roof, sides and floor of the vehicle may be similarly constructed to form a body structure, the interior passenger compartment of which may be controlled.

As disclosed above, the desirable properties of a vacuum are not limited to the geometrical shapes of the objects in which it is confined. A vacuum provides by its unique characteristics structural bonds, insulation means, sound-proofing, preservation of the containing products, sterilization features, inter alia. These benefits are modified and proportional to the elevation, temperature and volume of the confining object. However, this invention is intended to provide a broad application of the use of geometrical shapes which espouses vacuum energy.

This invention teaches the control of the properties of the vacuum space by controlling one of the characteristics of the vacuum, thereby compensating for these variables when utilizing a vacuum space for environmental purposes.

It is also obvious that vacuum properties as a structural bond would diminish at higher elevations and its insulating properties would increase. Therefore, at any given elevation at any given temperature, the vacuum torr may remain constant by changing the volume of the container. When the volume remains constant, such as in a controlled vacuum space, a change in temperature of the space will adversely affect its properties as an insulating means.

As further noted, the space in structures such as that shown in FIG. 1 may be controlled by controlling the vacuum in the common space 14 and 14A. If it is desired to utilize the heat of the atmosphere around the building, the torr in the space 14, 14A may be decreased to atmospheric pressure or above so that the energy of the atmosphere (temperature) may be passed through space 14, 14A through the conductive characteristics of medium (ambient contents) in this space. To insulate the interior space of the domical structure 10, a vacuum in this space is created.

It should be noted that the space between the floor members of the building when valve means 13A are open forms an insulating and/or conducting medium around the enclosure of this domical structure.

If it is desirable to heat the building from the earth and at the same time insulate the interior of the building from the temperature of the atmosphere, valve means 13A are closed and the space 14 is opened to atmosphere or to condensed ambient contents, thereby rendering the space between the floor members conductive. Thus, the heat of the earth on which the floor rests is conducted through the floor to heat its interior.

To isolate the interior of the building from the heat of the earth on which it rests, the space 14 is evacuated and valving members spaced apart.

This invention is directed to suitably shaped panels conformed to define an enclosed space wherein the vacuum and temperature of the space may be monitored and controlled periodically. The materials of the walls of the object may be rigid and/or pliable, as discussed under FIG. 5, so that they can expand or contract with the condition of the vacuum space therebetween. The contraction or expansion of one or more of the walls can aid in controlling the torr of the vacuum space. In fact, one of the walls may be moveable to increase the vacuum condition between the walls by its movement. Accordingly, the temperature of the surrounding atmosphere can be used to control and regulate the atmospheric condition of the vacuum space.

Although but a few embodiments of the invention have been illustrated and described, it will be apparent to those skilled in the art that various changes and modifications may be made therein without departing from the spirit of the invention or from the scope of the appended claims.

What is claimed is:

1. A multi-walled object comprising:
   first and second juxapositioned wall members,
   the first wall member positioned within the second wall member and enclosing a first space,
   means for enclosing a second space between said wall members,
   strut means mounted within said second space to extend between said wall members at spaced positions for supporting the wall members,
   said strut means comprising V-shaped configurations formed to control the flow of energy between the members and having its base engaging one wall member and its apex engaging the other wall member,
   valve means associated with one of said wall members and operable for periodically controlling the molecular count in said second between said wall members, and
   portal means extending through said wall members for ingress and egress into said first space,
   the first wall member comprising the floor, walls and ceiling for said first space for multi-purpose uses,
   said second space is formed into third and fourth isolatable spaces,
   the third space being formed between portions of said wall members forming the walls and ceiling of the object and the fourth space being formed between the portions of said wall members forming the floor of said object,
   said valve means being positioned between said third and fourth spaces to selectively isolate said third and fourth spaces, one from the other, and interconnecting them for controlling the molecular count in the third space.

2. The multi-walled object set forth in claim 1 wherein:
   the torr of said third space is controllable different from the torr of said fourth space.

3. The mutli-walled object set forth in claim 1 wherein:
   said wall members form a domical configuration.

4. The multi-walled object set forth in claim 1 wherein:
   said wall members form a polyhedron configuration.

5. The multi-walled object set forth in claim 1 wherein:
   said wall members form a cylindrical configuration.

6. The multi-wall object set forth in claim 1 wherein:
   said first member is formed of a pliable material.

* * * * *

UNITED STATES PATENT OFFICE
CERTIFICATE OF CORRECTION

Patent No. 4,468,902        Dated 9-4-84

Inventor(s) Pryce Wilson

It is certified that error appears in the above-identified patent and that said Letters Patent are hereby corrected as shown below:

Claim 1, line 17, after "second," insert ---space---.

Signed and Sealed this

Twelfth Day of February 1985

[SEAL]

Attest:

DONALD J. QUIGG

Attesting Officer    Acting Commissioner of Patents and Trademarks